(12) United States Patent
Shivashankaraiah

(10) Patent No.: US 9,183,142 B2
(45) Date of Patent: Nov. 10, 2015

(54) REDUCING FLASH MEMORY WRITE AMPLIFICATION AND LATENCY

(71) Applicant: LSI CORPORATION, San Jose, CA (US)

(72) Inventor: Vinay Bangalore Shivashankaraiah, Bangalore (IN)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 229 days.

(21) Appl. No.: 13/886,325

(22) Filed: May 3, 2013

(65) Prior Publication Data

US 2014/0281143 A1 Sep. 18, 2014

(30) Foreign Application Priority Data

Mar. 15, 2013 (IN) .......................... 1138/CHE/2013

(51) Int. Cl.
*G06F 12/00* (2006.01)
*G06F 12/02* (2006.01)
*G06F 3/06* (2006.01)

(52) U.S. Cl.
CPC ........ *G06F 12/0253* (2013.01); *G06F 12/0246* (2013.01); *G06F 3/0689* (2013.01)

(58) Field of Classification Search
None
See application file for complete search history.

(56) References Cited

U.S. PATENT DOCUMENTS

| 8,489,804 | B1 | 7/2013 | Nguyen et al. | |
|---|---|---|---|---|
| 2010/0023682 | A1 | 1/2010 | Lee et al. | |
| 2011/0055471 | A1* | 3/2011 | Thatcher et al. | 711/114 |
| 2012/0284587 | A1* | 11/2012 | Yu et al. | 714/773 |

* cited by examiner

*Primary Examiner* — Brian Peugh
(74) *Attorney, Agent, or Firm* — Sheridan Ross P.C.

(57) ABSTRACT

Data is distributed to solid-state disks (SSDs) using the RAID-0 technique. Based on a utilization of a first region of a first one of the SSDs, the first region is selected for garbage collection. Valid data from the first region is copied to an active region of the first one of the SSDs as part of a process of garbage collection. While the process of garbage collection is being performed, data is distributed to a subset of the SSDs using the RAID-0 technique where the subset of the SSDs does not include the first one of the plurality of nonvolatile solid-state memories selected for garbage collection.

20 Claims, 5 Drawing Sheets

```
┌─────────────────────────────────────┐
│  DISTRIBUTE DATA TO A PLURALITY     │
│  OF NONVOLATILE SOLID-STATE         │
│  MEMORIES USING A RAID-0            │
│  TECHNIQUE                          │
│  302                                │
└─────────────────────────────────────┘
              │
┌─────────────────────────────────────┐
│  BASED ON A UTILIZATION OF A FIRST REGION OF A │
│  FIRST ONE OF THE PLURALITY OF NONVOLATILE SOLID- │
│  STATE MEMORIES, SELECTING THE FIRST REGION OF │
│  THE FIRST ONE OF THE PLURALITY OF NONVOLATILE │
│  SOLID-STATE MEMORIES FOR GARBAGE COLLECTION │
│  304                                │
└─────────────────────────────────────┘
              │
┌─────────────────────────────────────┐
│  COPY VALID DATA FROM THE FIRST REGION OF THE │
│  FIRST ONE OF THE PLURALITY OF NONVOLATILE SOLID- │
│  STATE MEMORIES TO AN ACTIVE REGION OF THE FIRST │
│  ONE OF THE PLURALITY OF NONVOLATILE SOLID-STATE │
│  MEMORIES AS PART OF A PROCESS OF GARBAGE │
│  COLLECTION                         │
│  306                                │
└─────────────────────────────────────┘
              │
┌─────────────────────────────────────┐
│  WHILE THE PROCESS OF GARBAGE COLLECTION IS │
│  BEING PERFORMED, DISTRIBUTING DATA TO A SUBSET │
│  OF THE PLURALITY OF NONVOLATILE SOLID-STATE │
│  MEMORIES USING THE RAID-0 TECHNIQUE WHERE THE │
│  SUBSET DOES NOT INCLUDE THE FIRST ONE OF THE │
│  PLURALITY OF NONVOLATILE SOLID-STATE MEMORIES │
│  SELECTED FOR GARBAGE COLLECTION    │
│  308                                │
└─────────────────────────────────────┘
```

```
┌─────────────────────────────────────────────┐
│  MAINTAINING A FIRST SET OF FLAGS TO INDICATE │
│  WHICH OF THE PLURALITY OF NONVOLATILE SOLID- │
│  STATE MEMORIES IS UNDERGOING THE PROCESS OF  │
│            GARBAGE COLLECTION                 │
│                    402                        │
└─────────────────────────────────────────────┘
                      │
┌─────────────────────────────────────────────┐
│  MAINTAINING A SECOND SET OF FLAGS TO INDICATE│
│   WHICH OF THE PLURALITY OF NONVOLATILE SOLID-│
│     STATE MEMORIES IS BEING USED FOR GARBAGE  │
│   COLLECTION INFORMATION ON A RESPECTIVE ACTIVE│
│     REGION OF THE PLURALITY OF NONVOLATILE SOLID│
│                STATE MEMORIES                 │
│                    404                        │
└─────────────────────────────────────────────┘
                      │
┌─────────────────────────────────────────────┐
│    MAINTAINING A THIRD SET OF FLAGS ASSOCIATED│
│    WITH A PLURALITY OF LOGICAL BLOCK ADDRESSES│
│   THAT INDICATE WHEN METADATA ASSOCIATED WITH │
│      EACH OF THE PLURALITY OF LOGICAL BLOCK   │
│       ADDRESSES HAS NOT BEEN WRITTEN TO THE   │
│  PLURALITY OF NONVOLATILE SOLID-STATE MEMORIES│
│                    406                        │
└─────────────────────────────────────────────┘
                      │
┌─ ─ ─ ─ ─ ─ ─ ─ ─ ─ ─┴─ ─ ─ ─ ─ ─ ─ ─ ─ ─ ─ ─┐
│    AFTER THE PROCESS OF GARBAGE COLLECTION IS │
│   COMPLETE ON THE FIRST REGION OF THE FIRST ONE│
│     OF THE PLURALITY OF NONVOLATILE SOLID-STATE│
│   MEMORIES, DISTRIBUTE DATA TO THE COMPLETE SET│
│     OF THE PLURALITY OF NONVOLATILE SOLID-STATE│
│         MEMORIES USING THE RAID-0 TECHINQUE   │
│                     408                       │
└─ ─ ─ ─ ─ ─ ─ ─ ─ ─ ─ ─ ─ ─ ─ ─ ─ ─ ─ ─ ─ ─ ─┘
```

FIGURE 4

REDUCING FLASH MEMORY WRITE AMPLIFICATION AND LATENCY

BACKGROUND OF THE INVENTION

An undesirable occurrence with flash memory is write amplification. When write amplification occurs, the amount of data actually written to flash memory device is greater than the amount of data necessary to store that data. This occurs because flash memory must be erased before it can be rewritten. Thus, in order to write data to a particular block of flash memory, any data not being overwritten in that block must first be moved and written elsewhere. This multiplies the number of writes required which consumes bandwidth to the flash memory and decreases the life expectancy of the flash memory.

SUMMARY

An embodiment of the invention may therefore comprise a method of storing data to a nonvolatile solid-state memory, comprising: distributing data to a plurality of nonvolatile solid-state memories using a RAID-0 technique; based on a utilization of a first region of a first one of the plurality of nonvolatile solid-state memories, selecting the first region of the first one of the plurality of nonvolatile solid-state memories for garbage collection; copying valid data from the first region of the first one of the plurality of nonvolatile solid-state memories to an active region of the first one of the plurality of nonvolatile solid-state memories as part of a process of garbage collection; and, while the process of garbage collection is being performed, distributing data to subset of the plurality of nonvolatile solid-state memories using the RAID-0 technique, the subset of the plurality of nonvolatile solid-state memories not including the first one of the plurality of nonvolatile solid-state memories selected for garbage collection.

An embodiment of the invention may therefore further comprise a nonvolatile solid-state memory storage system, comprising: a plurality of nonvolatile solid-state memories; and, a nonvolatile solid-state memory controller configured to distribute data to the plurality of nonvolatile solid-state memories using a RAID-0 technique and configured to, based on a utilization of a first region of a first one of the plurality of nonvolatile solid-state memories, select the first region of the first one of the plurality of nonvolatile solid-state memories for garbage collection, and configured to copy valid data from the first region of the first one of the plurality of nonvolatile solid-state memories to an active region of the first one of the plurality of nonvolatile solid-state memories as part of a process of garbage collection, and configured to, while the process of garbage collection is being performed, distribute data to subset of the plurality of nonvolatile solid-state memories using the RAID-0 technique, the subset of the plurality of nonvolatile solid-state memories not including the first one of the plurality of nonvolatile solid-state memories selected for garbage collection.

BRIEF DESCRIPTION OF THE FIGURES

FIG. 4 is a flowchart of a method of maintaining information about data stored in nonvolatile solid-state memories.

DETAILED DESCRIPTION OF THE EMBODIMENTS

Figure 1:
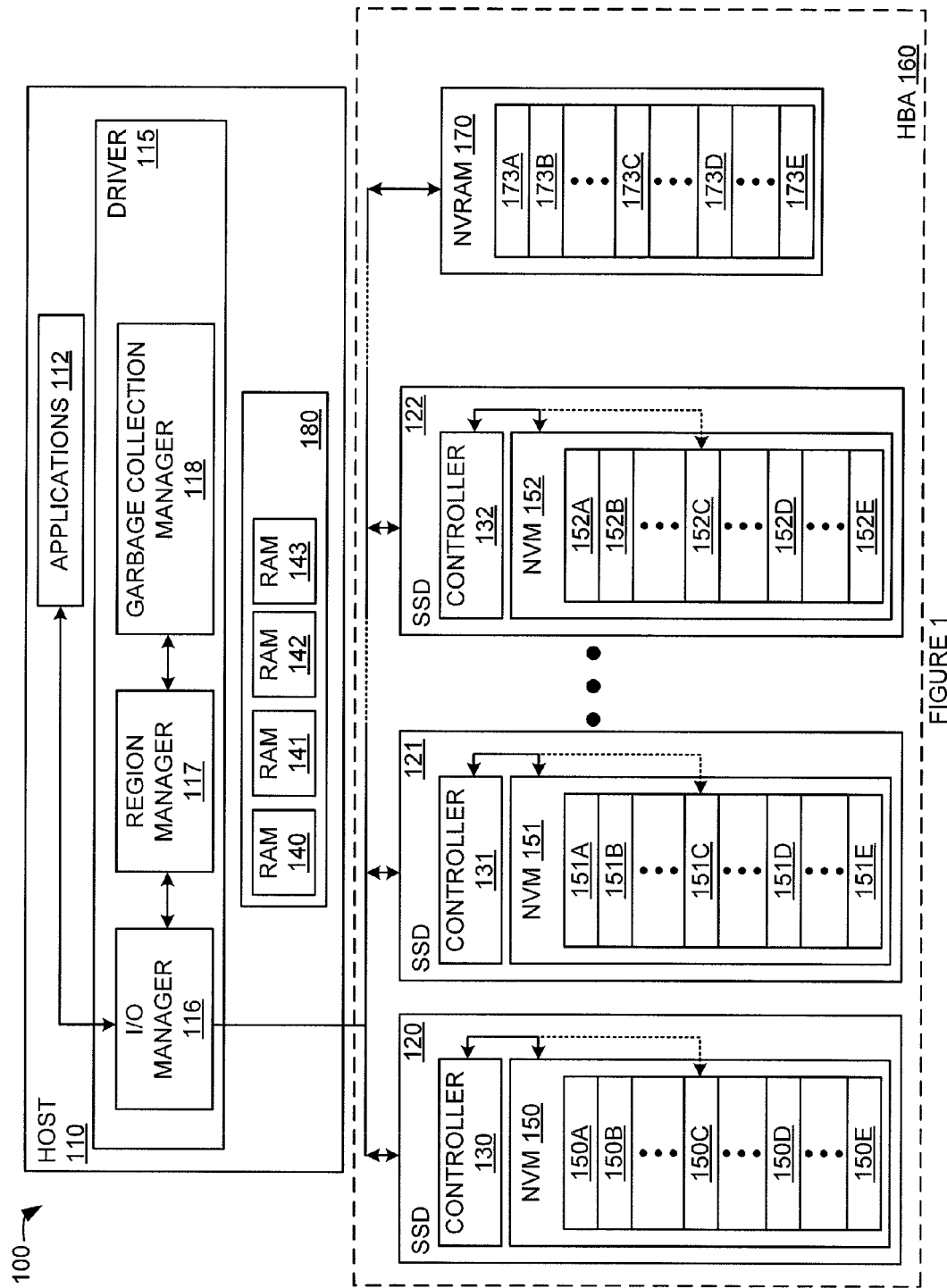
FIG. 1 is a block diagram of a storage system.

FIG. 1 is a block diagram block diagram of a storage system. In FIG. 1, storage system 100 is illustrated comprising host 110 and host bus adapter (HBA) 160. Host bus adapter 160 includes solid-state disk (SSD) 120, solid-state disk 121, solid-state disk 122, and nonvolatile random access memory (NVRAM) 170. Host 110 is operatively coupled to SSDs 120-122 and NVRAM 170. Host 110 includes applications 112, driver 115, memory 180. Memory 180 includes memory allocations 140-143. Driver 115 includes I/O manager 116, region manager 117 (a.k.a., flash layout management module), and garbage collection manager 118. Applications 112 are operatively coupled to driver 115 and I/O manager 116, in particular. I/O manager 116 is operatively coupled to region manager 117. Region manager 117 is operatively coupled to garbage collection manager 118.

SSD 120 includes controller 130, and nonvolatile memory (NVM) 150. Controller 130 is operatively coupled to NVM 150. Thus, controller 130 may operate and control NVM 150. Controller 130 may operate and control NVM 150 to emulate a mass storage device such as a disk drive. NVM 150 is shown having regions 150A-150E. Controller 130 is shown as optionally operatively coupled to at least one of the regions 150A-150E. Thus, controller 150 may be operatively coupled to one or more of regions 150A-150E to read and/or write data.

SSD 121 includes controller 131, and NVM 151. Controller 131 is operatively coupled to NVM 151. Thus, controller 131 may operate and control NVM 151. Controller 131 may operate and control NVM 151 to emulate a mass storage device such as a disk drive. NVM 151 is shown having regions 151A-151E. Controller 131 is shown as optionally operatively coupled to at least one of the regions 151A-151E. Thus, controller 151 may be operatively coupled to one or more of regions 151A-151E to read and/or write data.

SSD 122 includes controller 132, and NVM 152. Controller 132 is operatively coupled to NVM 152. Thus, controller 132 may operate and control NVM 152. Controller 132 may operate and control NVM 151 to emulate a mass storage device such as a disk drive. NVM 152 is shown having regions 152A-152E. Controller 132 is shown as optionally operatively coupled to at least one of the regions 152A-152E. Thus, controller 152 may be operatively coupled to one or more of regions 152A-152E to read and/or write data. NVMs 150-152 may also be known as "flash memory." In an embodiment, NVMs 150-152 may be NAND type flash memory.

Host 110 is operatively coupled to HBA 160 and NVRAM 170. Host includes memory 180. Memory 180 includes memory allocations 140-143. Thus, Host 110 may operate and control memory 180 and NVRAM 170. NVRAM 170 is shown partitioned into regions 173A-173E. Thus, Host 110, and driver 115 and/or the elements of driver 115 may be operatively coupled to one or more of regions 173A-173E to read and/or write data.

SSDs 120-122 are operatively coupled to host 110. SSDs 120-122 are operatively coupled to driver 115, and I/O manager 116 in particular. Within SSDs 120-122, controllers 130-132 are shown as operatively coupled to driver 115, and I/O manager 116 in particular.

In an embodiment, storage system 100 creates a redundant array of inexpensive disks (RAID) level 0 (RAID-0) volume across SSDs 120-122. Region manager 117 manages and controls the allocation and use of the regions 173A-173E. Region manager 117 is responsible for breaking up NVRAM 170 into the regions 173A-173E. The region manager breaks NVRAM 170 into blocks of a set size (e.g., 1 GB regions) which each then contain a smaller sized metadata block. A region size may be chosen as two times the size of controllers 130-133 block size used for batch erasing NVMs 150-152, respectively. Region manager 117 allocates regions 173A-173E such that each region 173A-173E is restricted to (i.e., corresponds to) a single SSD 120-123.

Region manager 117 also maintains at least one active region which is used for I/O transactions from host 110 (e.g., application 112) and for garbage collection activities (i.e., I/O transactions from garbage collection manager 118). In an embodiment, region manager 117 maintains an active region for each of SSDs 120-122. For example, as illustrated in FIG. 1, region manager 117 may maintain maintains an active region 173A-173E for each of SSDs 120-122, respectively. Region manager 117 assigns usable LBA locations in the active regions for both host 110 I/O transactions and garbage collection activities.

Initially, as I/O transactions are received by driver 115, region manager 117 assigns LBAs to be used from all active regions on SSDs 120-122 in parallel. This helps keep flash controllers 130-132 all busy simulating the RAID-0 volume.

When a region on an SSD 120-122 has a sufficient amount of data that is no longer needed (a.k.a., stale pages or "holes"), the rest of the region (i.e., the part(s) of the region with good data that is still needed) is read and re-written to another region that has been previously erased (i.e., that is empty). This process is called "garbage collection" and is managed by garbage collection manager 118.

In an embodiment, when garbage collection manager 118 selects a region for garbage collection, the SSD holding that region is marked for garbage collection activity. While the garbage collection procedure is being performed on the selected region (and SSD), host I/O transactions are sent to active regions on SSDs 120-122 that do not have garbage collection activity currently being performed on them. The garbage collection I/O transactions are sent to the active region of the SSD on which the garbage collection procedure is being performed.

Figure 2:
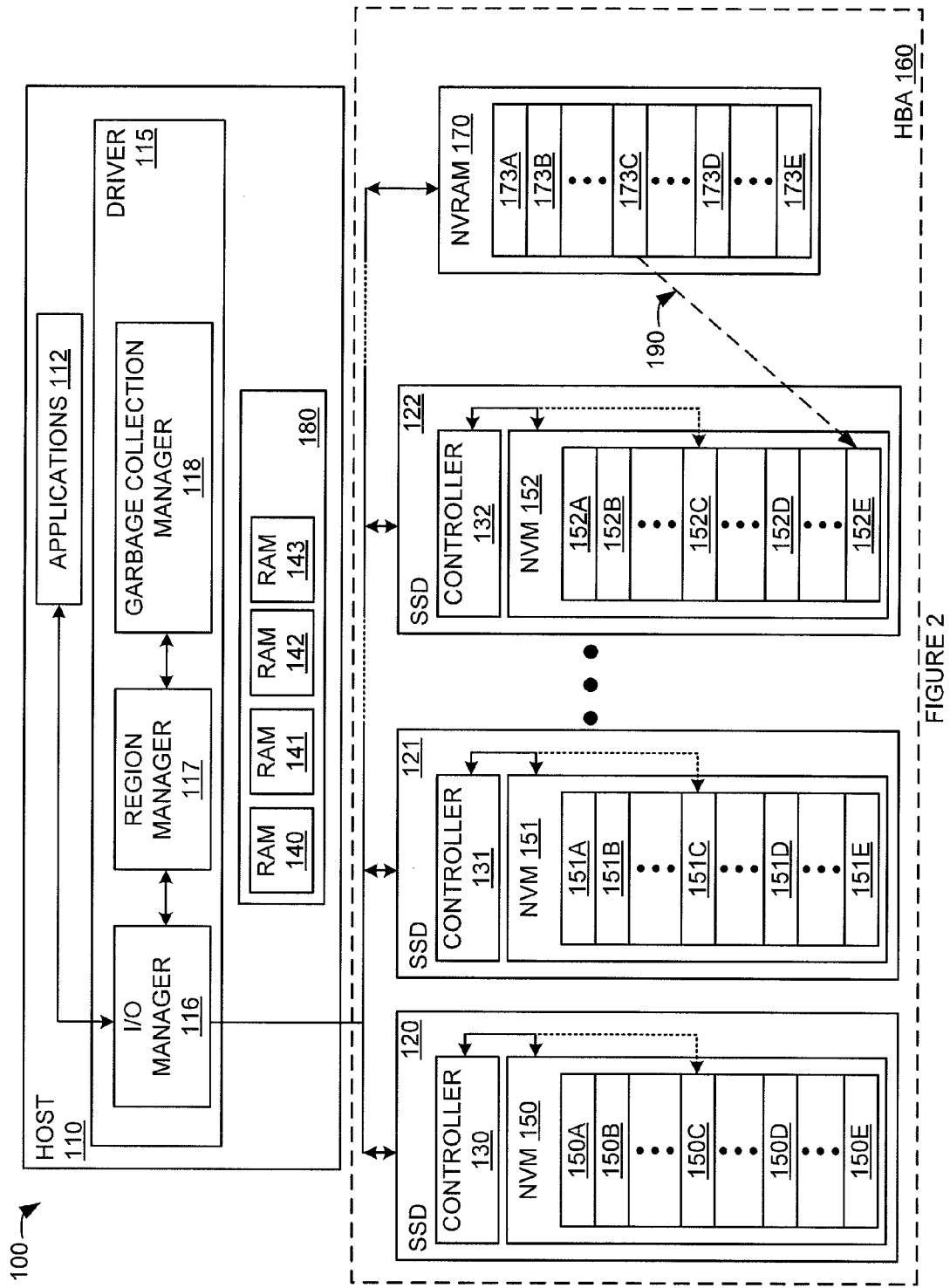
FIG. 2 is a functional block diagram of a storage system.

For example, as illustrated in FIG. 2, if garbage collection manager 118 selects region 173C for garbage collection, while the garbage collection procedure is being performed (shown in FIG. 2 by arrow 190 from region 173C to region 152E), host 110 I/O transactions are sent to the other SSDs 120 and 121.

It should be understood that by sending garbage collection I/O transactions that transfer garbage collection data from the region 173A-173E being garbage collected, multiple regions can be used for garbage collection activity to fill the current active region. In other words, if the garbage collection data from region being garbage collected exceeds the free space on the active region, region manager 117 can allocate another active region to receive the remaining garbage collection data associated with the region being garbage collected. It should also be understood that by separating out host 110 I/O transactions and garbage collection I/O transactions into different regions (and/or different SSDs 120-122), the co-location of frequently changing data is increased. Likewise, by separating out host 110 I/O transactions and garbage collection I/O transactions into different regions (and/or different SSDs 120-122), the co-location of stagnant (i.e., not as frequently changing data) data is increased. This results in frequently changing data and stagnant data migrating to different regions. This helps avoid the fragmentation of stale data blocks across a large number of regions. The fragmentation of stale data blocks across a large number of regions can lead to unnecessary movement (i.e., write amplification) of large amounts of data (i.e., blocks) during garbage collection procedures.

In another embodiment, when garbage collection manager 118 selects a region for garbage collection, system 100 may send garbage collection I/O transactions to the active region of an SSD on which the garbage collection procedure is not being performed. This may be done to help equalize the distribution of regions with similar amounts of holes across all SSDs 120-122. Flags can be used to indicate which SSD 120-122 is being used for garbage collection activity on a region, and which SSD 120-122 is being used to receive the garbage collection data on its active region. This can help migrate garbage collection I/O transactions from different SSDs 120-122 to an SSD 120-122 with a larger number of regions with a relatively high stale block density. By managing where host 100 I/O transactions and garbage collection I/O transactions are stored, the load on controllers 130-132 can be balanced (i.e., attempted to be equalized among all controllers 130-132).

In an embodiment, metadata can be managed at the SSD 120-122 level. Driver 115 uses NVRAM 170 to store metadata within each active region (in the metadata section of that region 173A-173E, respectively.) Once a metadata section is filled up with I/O transactions from host 100 and/or garbage collection manager 118, the metadata block is written.

As metadata is retrieved from NVRAM 170 during system 100 initialization, the metadata sections should be read in the order they were written so that stale references (i.e., LBA references to stale data that has been moved by, for example, garbage collection) are replaced with the most current LBA of the good data. In an embodiment, region manager 117 assigns a sequence number to the current active metadata section. This sequence number is to be written along with, and at the same time as, the metadata section. The sequence numbers typically increase across SSDs 120-122 because all of the active regions are being used in parallel.

To avoid the same LBA location from being rewritten multiple times in different metadata sections that are still open, a flag is maintained in the host LBA mapping. This flag indicates the current LBA location has yet to be flushed to an SSD (i.e., it is still in a transient state in NVRAM 170.) If this flag is set and the same LBA is rewritten, then the new data is written to the same metadata section to avoid data corruption. To write the new data to the same section, a search in NVRAM 170 is made to find the right metadata section for the right SSD 120-122. It should be understood that the probability of having to perform this search is low.

Figure 3:
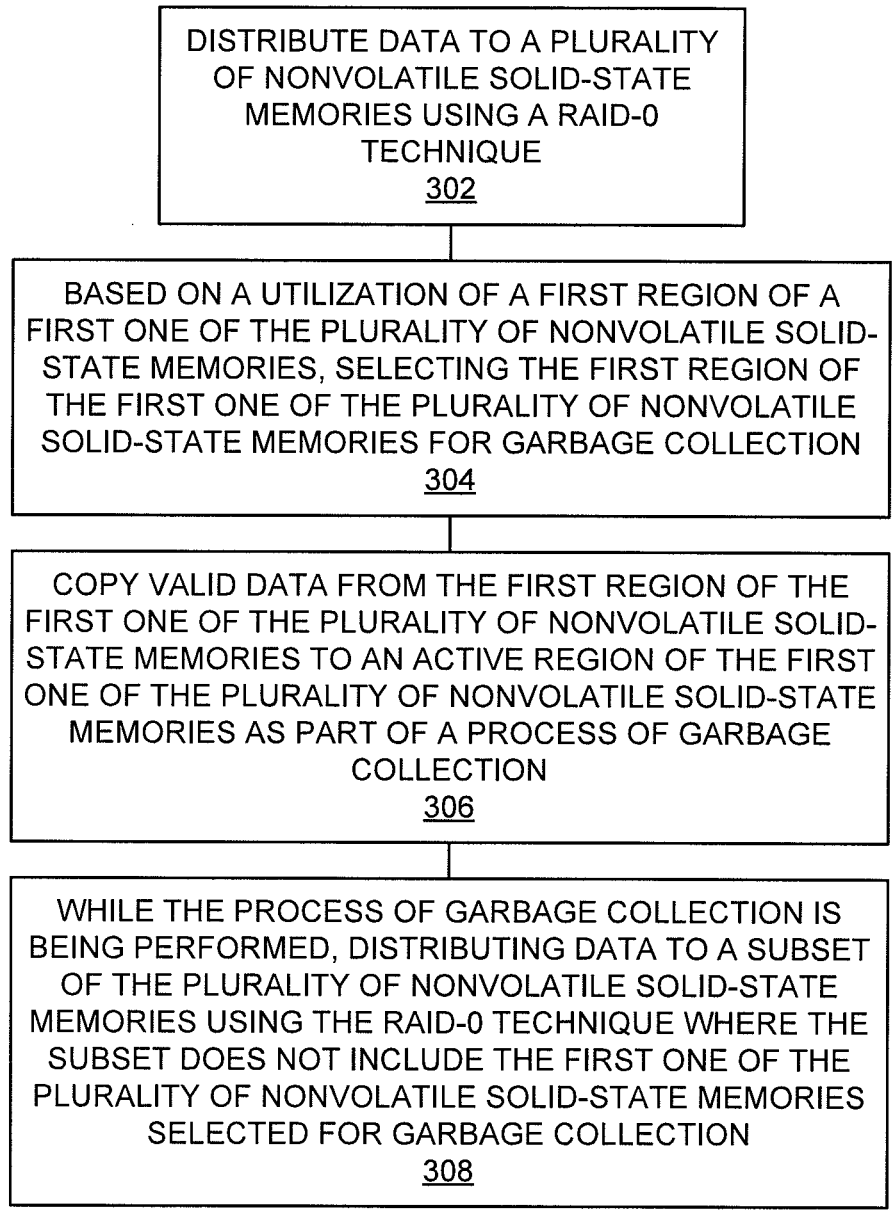
FIG. 3 is a flowchart of a method of storing data to nonvolatile solid-state memories.

FIG. 3 is a flowchart of a method of storing data to nonvolatile solid-state memories. The steps illustrated in FIG. 3 may be performed by one or more elements of storage system 100. Data is distributed to a plurality of nonvolatile solid-state memories using a RAID-0 technique (302). For example, driver 115 (and region manager 117, in particular) may distribute data across SSDs 120-122 using a RAID-0 technique to such that all SSDs 120-122 appear to applications 112 as a single volume.

Based on a utilization of a first region of a first one of the plurality of nonvolatile solid-state memories, the first region of the first one of the plurality of nonvolatile memories is selected for garbage collection (304). For example, based on a utilization (i.e., the amount of stale data blocks or holes) of a region 173C on NVRAM 170, region 173C is selected for garbage collection by garbage collection manager 118.

Valid data is copied from the first region of the first one of the plurality of nonvolatile solid-state memories to an active region of the first one of the plurality of nonvolatile solid-state memories as part of a process of garbage collection (306). For example, the valid (i.e., non-stale) data stored in region 173C is copied to region 152E of SSD 122 under the control of garbage collection manager 118 as part of a garbage collection process.

While the process of garbage collection is being performed, data is distributed to a subset of the plurality of nonvolatile solid-state memories using the RAID-0 technique where the subset does not include the first one of the plurality of nonvolatile solid-state memories selected for garbage collection (308). For example, while the valid data is being copied from region 173C to region 152E, host 100 I/O transactions are distributed to SSDs 120 and 121 (but not SSD 122) using a RAID-0 technique such that all SSDs 120 and 121 (but not SSD 122) appear to applications 112 as a single volume.

In an embodiment, after the process of garbage collection is complete on the first region of the first one of the plurality of nonvolatile solid-state memories, data is distributed to the complete set of the plurality of nonvolatile solid-state memories using the RAID-0 technique. For example, after the valid data is copied from region 173C to region 152E, host 110 I/O transactions are distributed to SSDs 120-122 using a RAID-0 technique such that all SSDs 120-122) appear to applications 112 as a single volume.

A first set of flags can be maintained to indicate which of the plurality of nonvolatile solid-state memories is undergoing the process of garbage collection. For example, driver 115 can maintain a first set of flags to indicate which of the plurality of SSDs 120-122 undergoing the process of garbage collection. A second set of flags can be maintained to indicate which of the plurality of nonvolatile solid-state memories is being used for garbage collection information on a respective active region of the plurality of nonvolatile solid-state memories. For example, driver 115 can maintain a second set of flags to indicate which of SSDs 120, 121, or 122 is being used to receive the garbage collection data from NVRAM 170. A third set of flags associated with a plurality of logical block addresses that indicate when metadata associated with each of the plurality of logical block addresses has not been written to the plurality of nonvolatile solid-state memories can be maintained.

FIG. 4 is a flowchart of a method of maintaining information about data stored in nonvolatile solid-state memories. The steps illustrated in FIG. 4 may be performed by one or more elements of storage system 100. A first set of flags is maintained to indicate which of the plurality of nonvolatile solid-state memories is undergoing the process of garbage collection (402). For example, driver 115 can maintain a first set of flags to indicate which of the plurality of SSDs 120-122 undergoing the process of garbage collection.

A second set of flags can be maintained to indicate which of the plurality of nonvolatile solid-state memories is being used for garbage collection information on a respective active region of the plurality of nonvolatile solid-state memories (404). For example, driver 115 can maintain a second set of flags to indicate which of SSDs 120, 121, or 122 is being used to receive the garbage collection data from NVRAM 170. A third set of flags associated with a plurality of logical block addresses that indicate when metadata associated with each of the plurality of logical block addresses has not been written to the plurality of nonvolatile solid-state memories can be maintained (406).

Optionally, after the process of garbage collection is complete on the first region of the first one of the plurality of nonvolatile solid-state memories, data is distributed to the complete set of the plurality of nonvolatile solid-state memories using the RAID-0 technique (408). For example, after the valid data is copied from region 173C to region 152E, host 110 I/O transactions may be distributed to SSDs 120-122 using the RAID-0 technique such that all SSDs 120-122) appear to applications 112 as a single volume.

The methods, systems, and functions described above may be implemented with or executed by one or more computer systems. The methods described above may also be stored on a non-transitory computer readable medium. Many of the elements of storage system 100 and may be, comprise, or include computers systems. This includes, but is not limited to host 110, SSDs 120-122, and controllers 130-132.

Figure 5:
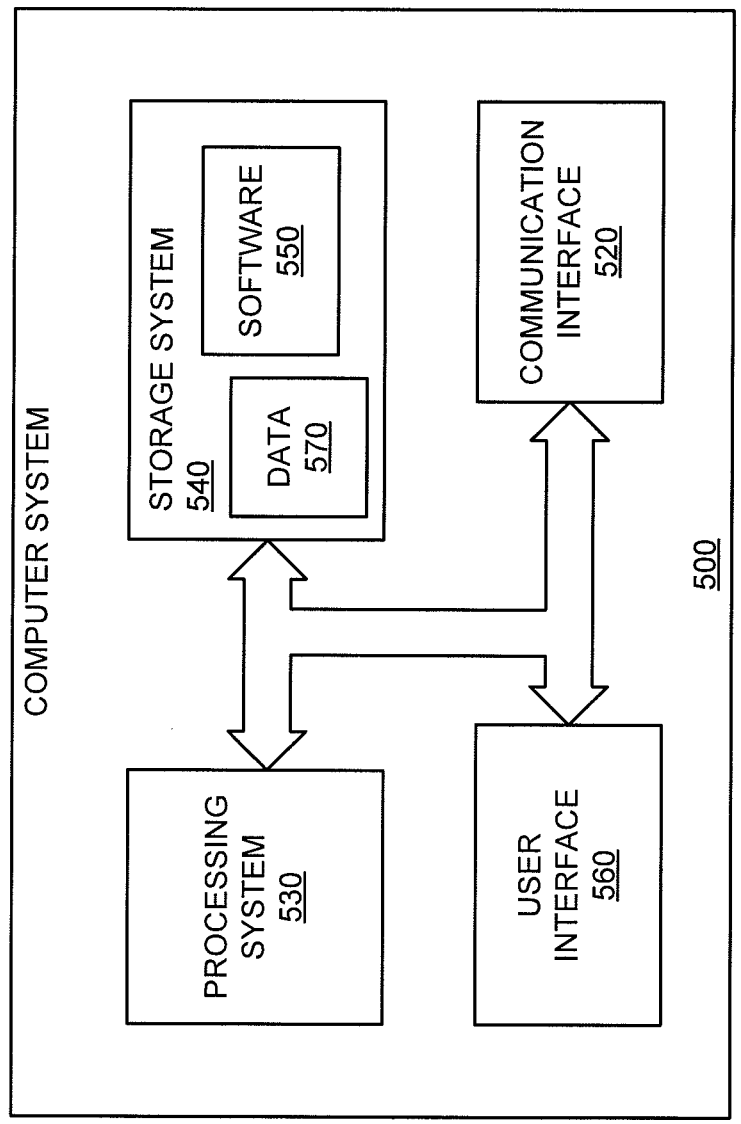
FIG. 5 is a block diagram of a computer system.

FIG. 5 illustrates a block diagram of a computer system. Computer system 500 includes communication interface 520, processing system 530, storage system 540, and user interface 560. Processing system 530 is operatively coupled to storage system 540. Storage system 540 stores software 550 and data 570. Processing system 530 is operatively coupled to communication interface 520 and user interface 560. Computer system 500 may comprise a programmed general-purpose computer. Computer system 500 may include a microprocessor. Computer system 500 may comprise programmable or special purpose circuitry. Computer system 500 may be distributed among multiple devices, processors, storage, and/or interfaces that together comprise elements 520-570.

Communication interface 520 may comprise a network interface, modem, port, bus, link, transceiver, or other communication device. Communication interface 520 may be distributed among multiple communication devices. Processing system 530 may comprise a microprocessor, microcontroller, logic circuit, or other processing device. Processing system 530 may be distributed among multiple processing devices. User interface 560 may comprise a keyboard, mouse, voice recognition interface, microphone and speakers, graphical display, touch screen, or other type of user interface device. User interface 560 may be distributed among multiple interface devices. Storage system 540 may comprise a disk, tape, integrated circuit, RAM, ROM, network storage, server, or other memory function. Storage system 540 may be a computer readable medium. Storage system 540 may be distributed among multiple memory devices.

Processing system 530 retrieves and executes software 550 from storage system 540. Processing system 530 may retrieve and store data 570. Processing system 530 may also retrieve and store data via communication interface 520. Processing system 530 may create or modify software 550 or data 570 to achieve a tangible result. Processing system 530 may control communication interface 520 or user interface 560 to achieve a tangible result. Processing system 530 may retrieve and execute remotely stored software via communication interface 520.

Software 550 and remotely stored software may comprise an operating system, utilities, drivers, networking software, and other software typically executed by a computer system. Software 550 may comprise an application program, applet, firmware, or other form of machine-readable processing instructions typically executed by a computer system. When executed by processing system 530, software 550 or remotely stored software may direct computer system 500 to operate as described herein.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of storing data to a nonvolatile solid-state memory, comprising:
   distributing data from a host to a plurality of nonvolatile solid-state memories using a RAID-0 technique;
   based on a utilization of a first region of a first one of the plurality of nonvolatile solid-state memories, selecting the first region of the first one of the plurality of nonvolatile solid-state memories for garbage collection;
   copying valid data from a region of a nonvolatile random access memory to at least the first region of the first one of the plurality of nonvolatile solid-state memories as part of a process of garbage collection; and
   while the process of garbage collection is being performed, distributing the data from the host to a subset of the plurality of nonvolatile solid-state memories using the RAID-0 technique, the subset of the plurality of nonvolatile solid-state memories not including the first one of the plurality of nonvolatile solid-state memories selected for garbage collection.

2. The method of claim 1, further comprising:
   after the process of garbage collection is complete on the first region of the first one of the plurality of nonvolatile solid-state memories, distributing the data from the host to the complete set of the plurality of nonvolatile solid-state memories using the RAID-0 technique.

3. The method of claim 1, further comprising:
   maintaining a first set of flags to indicate which of the plurality of nonvolatile solid-state memories is undergoing the process of garbage collection.

4. The method of claim 3, further comprising:
   maintaining a second set of flags to indicate which of the plurality of nonvolatile solid-state memories being used for garbage collection information on a respective active region of the plurality of nonvolatile solid-state memories.

5. The method of claim 4, further comprising:
   maintaining a third set of flags associated with a plurality of logical block addresses that indicate when metadata associated with each of the plurality of logical block addresses has not been written to the plurality of nonvolatile solid-state memories.

6. The method of claim 3, further comprising:
   after the process of garbage collection is complete on the first region of the first one of the plurality of nonvolatile solid-state memories, distributing the data from the host to the complete set of the plurality of nonvolatile solid-state memories using the RAID-0 technique.

7. A nonvolatile solid-state memory storage system, comprising:
   a plurality of nonvolatile solid-state memories; and
   a nonvolatile solid-state memory driver configured to distribute data from a host to the plurality of nonvolatile solid-state memories using a RAID-0 technique and configured to, based on a utilization of a first region of a first one of the plurality of nonvolatile solid-state memories, select the first region of the first one of the plurality of nonvolatile solid-state memories for garbage collection, and configured to copy valid data from a region of a nonvolatile random access memory to at least the first region of the first one of the plurality of nonvolatile solid-state memories as part of a process of garbage collection, and configured to, while the process of garbage collection is being performed, distribute the data from the host to a subset of the plurality of nonvolatile solid-state memories using the RAID-0 technique, the subset of the plurality of nonvolatile solid-state memories not including the first one of the plurality of nonvolatile solid-state memories selected for garbage collection.

8. The storage system of claim 7, wherein the nonvolatile solid-state memory driver is further configured to:
   after the process of garbage collection is complete on the first region of the first one of the plurality of nonvolatile solid-state memories, distribute the data from the host to the complete set of the plurality of nonvolatile solid-state memories using the RAID-0 technique.

9. The storage system of claim 7, wherein the nonvolatile solid-state memory driver is further configured to:
   maintain a first set of flags to indicate which of the plurality of nonvolatile solid-state memories is undergoing the process of garbage collection.

10. The storage system of claim 9, wherein the nonvolatile solid-state memory driver is further configured to:
    maintain a second set of flags to indicate which of the plurality of nonvolatile solid-state memories being used for garbage collection information on a respective active region of the plurality of nonvolatile solid-state memories.

11. The storage system of claim 10, wherein the nonvolatile solid-state memory driver is further configured to:
    maintain a third set of flags associated with a plurality of logical block addresses that indicate when metadata associated with each of the plurality of logical block addresses has not been written to the plurality of nonvolatile solid-state memories.

12. The storage system of claim 9, wherein the nonvolatile solid-state memory driver is further configured to:
    after the process of garbage collection is complete on the first region of the first one of the plurality of nonvolatile solid-state memories, distribute the data from the host to the complete set of the plurality of nonvolatile solid-state memories using the RAID-0 technique.

13. The storage system of claim 7, wherein each of the plurality of nonvolatile solid-state memories are included in solid-state disks having a respective controller that is responsive to instructions received from the nonvolatile solid-state memory driver.

14. The storage system of claim 7, wherein the plurality of nonvolatile solid-state memories and the nonvolatile random access memory are included in a host bus adapter.

15. A non-transitory computer readable medium having instructions stored thereon for storing data to a nonvolatile solid-state memory that, when executed by a computer, at least instruct the computer to:
    distribute data from a host to a plurality of nonvolatile solid-state memories using a RAID-0 technique;
    based on a utilization of a first region of a first one of the plurality of nonvolatile solid-state memories, select the first region of the first one of the plurality of nonvolatile solid-state memories for garbage collection;
    copy valid data from the first region of the first one of the plurality of nonvolatile solid-state memories to an active region of the first one of the plurality of nonvolatile solid-state memories as part of a process of garbage collection; and while the process of garbage collection is being performed, distribute the data from the host to a subset of the plurality of nonvolatile solid-state memories using the RAID-0 technique, the subset of the plurality of nonvolatile solid-state memories not including the first one of the plurality of nonvolatile solid-state memories selected for garbage collection.

16. The medium of claim 15, wherein the computer is further instructed to:
after the process of garbage collection is complete on the first region of the first one of the plurality of nonvolatile solid-state memories, distribute the data from the host to the complete set of the plurality of nonvolatile solid-state memories using the RAID-0 technique.

17. The medium of claim 15, wherein the computer is further instructed to:
maintain a first set of flags to indicate which of the plurality of nonvolatile solid-state memories is undergoing the process of garbage collection.

18. The medium of claim 17, wherein the computer is further instructed to:
maintain a second set of flags to indicate which of the plurality of nonvolatile solid-state memories being used for garbage collection information on a respective active region of the plurality of nonvolatile solid-state memories.

19. The medium of claim 18, wherein the computer is further instructed to:
maintaining a third set of flags associated with a plurality of logical block addresses that indicate when metadata associated with each of the plurality of logical block addresses has not been written to the plurality of nonvolatile solid-state memories.

20. The medium of claim 17, wherein the computer is further instructed to:
after the process of garbage collection is complete on the first region of the first one of the plurality of nonvolatile solid-state memories, distribute the data from the host to the complete set of the plurality of nonvolatile solid-state memories using the RAID-0 technique.

* * * * *